(12) United States Patent
Gupta et al.

(10) Patent No.: US 6,423,913 B1
(45) Date of Patent: Jul. 23, 2002

(54) LOCKING DEVICE FOR HANDLE OPERATING MECHANISMS

(75) Inventors: Pankaj Gupta, Uttranchal; Ranjit Sunil Acharya, Nagpur; Amit Narang, Chandigarh, all of (IN); John Joseph Struble, Jr., Mebane, NC (US); Edgar Yee, Chapel Hill, NC (US); David Edward Thorn, Burlington, NC (US); Elwood Rau Combs, Mebane, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/795,206

(22) Filed: Feb. 28, 2001

(51) Int. Cl.⁷ .................................................. H01H 9/20
(52) U.S. Cl. ............................... 200/50.11; 200/43.11; 200/43.14; 200/43.15; 200/50.21
(58) Field of Search ........................... 200/43.11, 43.14, 200/43.15, 50.01, 50.02, 50.03, 50.11, 50.12, 50.17, 50.19, 50.21–50.26, 400, 401, 331; 335/8, 21, 202; 361/605–610, 615, 616, 621–623, 631, 634, 673

(56) References Cited

U.S. PATENT DOCUMENTS

| | | | | |
|---|---|---|---|---|
| 4,260,861 A | * | 4/1981 | DiMarco | 200/43.15 |
| 4,785,145 A | | 11/1988 | Owens et al. | 200/162 |
| 4,884,164 A | | 11/1989 | Dziura et al. | 361/97 |
| 4,945,450 A | | 7/1990 | Sabatella et al. | 361/334 |
| 5,424,911 A | | 6/1995 | Joyner et al. | 361/616 |
| 5,449,867 A | * | 9/1995 | Kelaita et al. | 200/43.14 |
| 5,657,193 A | | 8/1997 | Purkayastha | 361/23 |
| 5,663,862 A | * | 9/1997 | Hopping-Mills | 200/43.15 |
| 6,087,602 A | * | 7/2000 | Bernier et al. | 200/50.11 |

* cited by examiner

*Primary Examiner*—Michael Friedhofer
(74) *Attorney, Agent, or Firm*—Cantor Colburn LLP

(57) ABSTRACT

A locking device for use on an electric disconnect switch having a handle operator assembly. The locking device includes a slide plate slidably positioned within the housing and a first lock arranged to engage said slide plate and secure the handle operator assembly in an engaged position.

32 Claims, 9 Drawing Sheets

LOCKING DEVICE FOR HANDLE OPERATING MECHANISMS

BACKGROUND OF THE INVENTION

This invention relates to circuit breakers, and, more particularly, to a motor control center circuit breaker assembly.

Motor control centers, such as described in U.S. Pat. No. 5,424,911 entitled Compact Motor Controller Assembly, contain several components related to electric motor operation such as electric contactors, circuit breakers, power supply transformers, disconnect switches and the like.

An electric disconnect switch is described in U.S. Pat. No. 4,785,145 entitled Modular Electrical Disconnect Switch, and one such circuit breaker is described in U.S. Pat. No. 4,884,164 entitled Molded Case Circuit Interrupter. The use of a circuit breaker for both motor protection and switch functions is described in U.S. Pat. No. 4,945,450 entitled Modular Electric Switch-Circuit Breaker Assembly. A unit combining both circuit breaker and contactor functions is found in U.S. Pat. No. 5,657,193 entitled Electronic Control Module for Motor Controller Units.

It is frequently necessary to ensure that electrical equipment cannot be operated, for example while maintenance work is being carried out. It is essential to ensure that circuit breakers associated with the electrical equipment are secured in the OFF position to avoid inadvertent operation that can lead to unplanned exposure of personnel or equipment.

Also, it is often necessary to ensure that the electrical equipment is secured in the ON position, to prevent accidental shutdown of machinery, such as refrigeration equipment, life support systems, fire protection devices and continuous processes which require 1–2 days to start (e.g. cement manufacturing). Therefore, the ability to lock the circuit breaker in either the OFF position or the ON position is desirable.

When a circuit breaker is used with motor control units (centers) as an electric disconnect switch, it is important that the operating handle be locked in the OFF position mechanically so that the operating handle cannot be moved to the ON position. It is also important to ensure that the prior to locking the operating handle in the OFF position, the operating handle is in the true or positive OFF position. It may also desirable to lock the operating handle in the ON position.

BRIEF SUMMARY OF THE INVENTION

The above discussed and other drawbacks and deficiencies of the prior art are overcome or alleviated by a locking device for use of an electric disconnect switch having a handle operator assembly. In an exemplary embodiment of the invention, a locking device for use on an electric disconnect switch having a handle operator assembly including a slide plate slidably positioned within the housing and a first lock arranged to engage said slide plate and secure the handle operator assembly in an engaged position.

BRIEF DESCRIPTION OF THE DRAWINGS

Referring to the exemplary drawings wherein like elements are numbered alike in the FIGS..

DETAILED DESCRIPTION OF THE INVENTION

Figure 1:
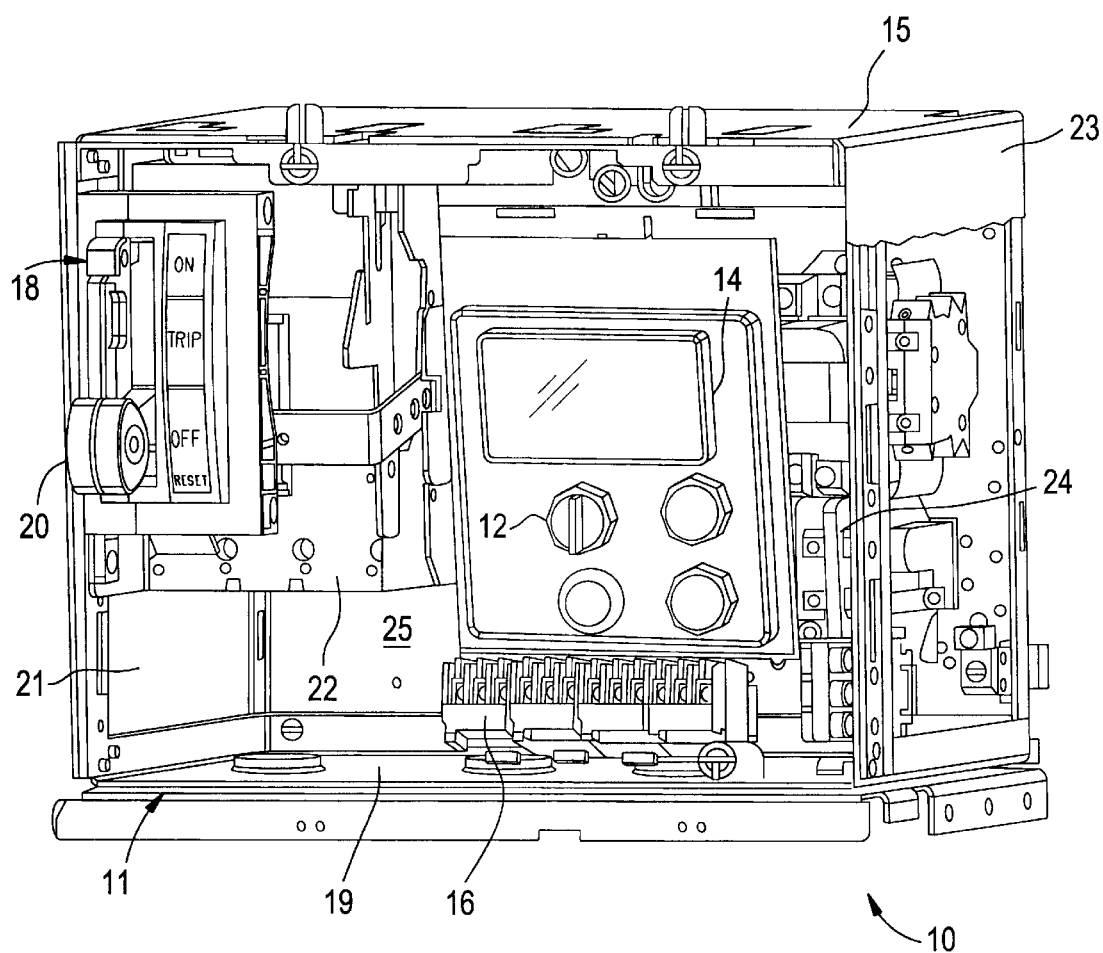
FIG. 1 is a front perspective view of a motor control center containing a circuit breaker in accordance with the invention.

Referring to FIG. 1, a motor control center 10 is generally shown. An enclosure 11 includes control knobs 12 and an indicator window 14 for providing access to electrical components, such as a motor contactor unit 24 similar to that described within the aforementioned U.S. Pat. No. 5,657,193, which is incorporated by reference. As shown in FIG. 1, enclosure 11 includes a cover (top) 15, an opposing bottom 19, opposing side walls 21, 23, which connect the bottom 19 and the cover 15, and a rear wall 25. Electrical connection between the electrical components and an associated electrical distribution system is made by terminal connectors 16 located on the front of the enclosure 11. A circuit breaker assembly (electric disconnect switch assembly) 18, in this exemplary embodiment of the invention, includes a handle operator assembly (handle operating mechanism) 20 extending from the front of enclosure 11 for providing manual operation of a circuit breaker (electrical disconnect switch) 22 and is attached to the rear wall 25 of enclosure 11 in the manner to be described below.

Figure 2:
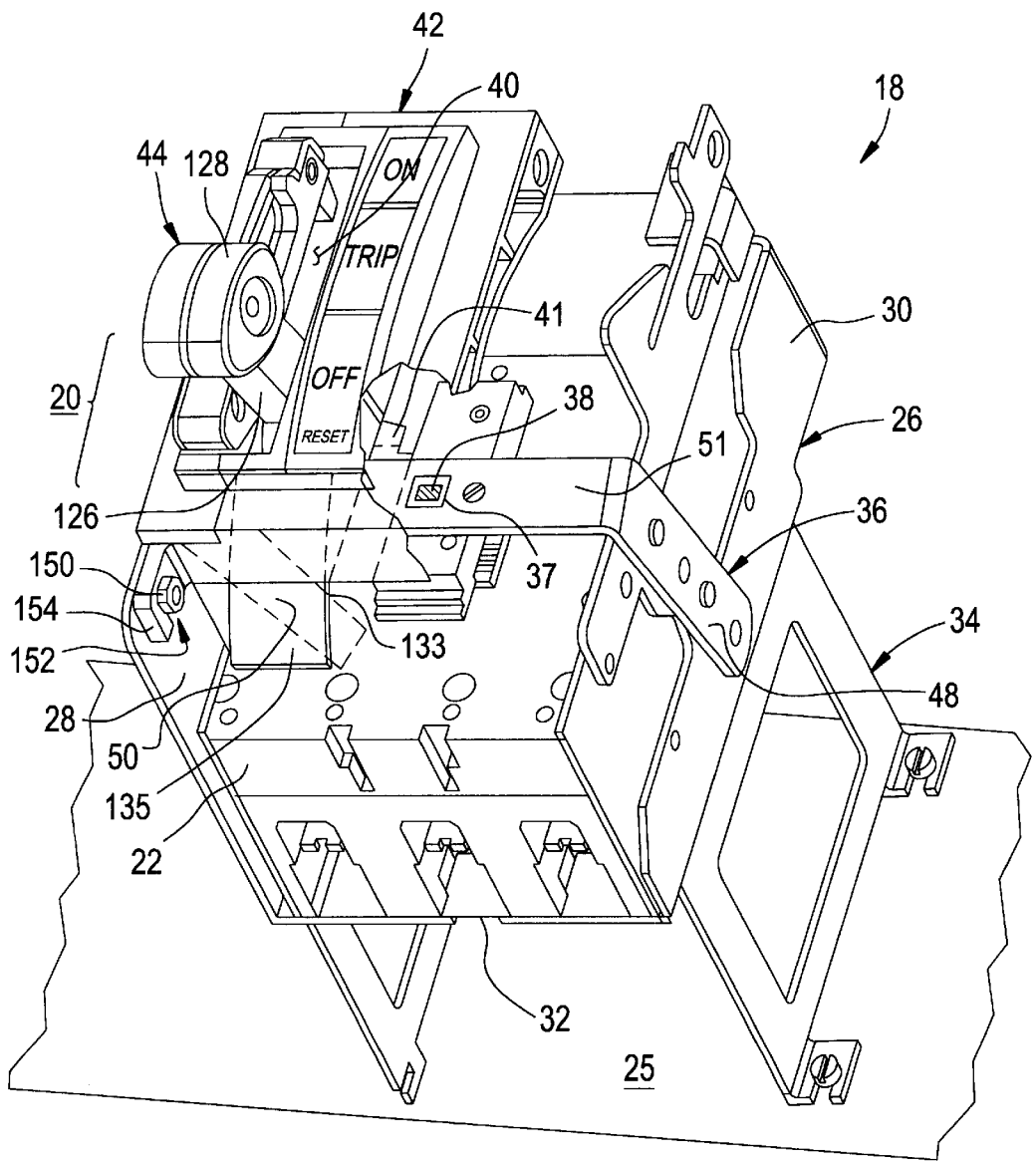
FIG. 2 is a perspective view of a handle operating assembly and a circuit breaker assembly within the motor control center of FIG. 1.
Figure 3:
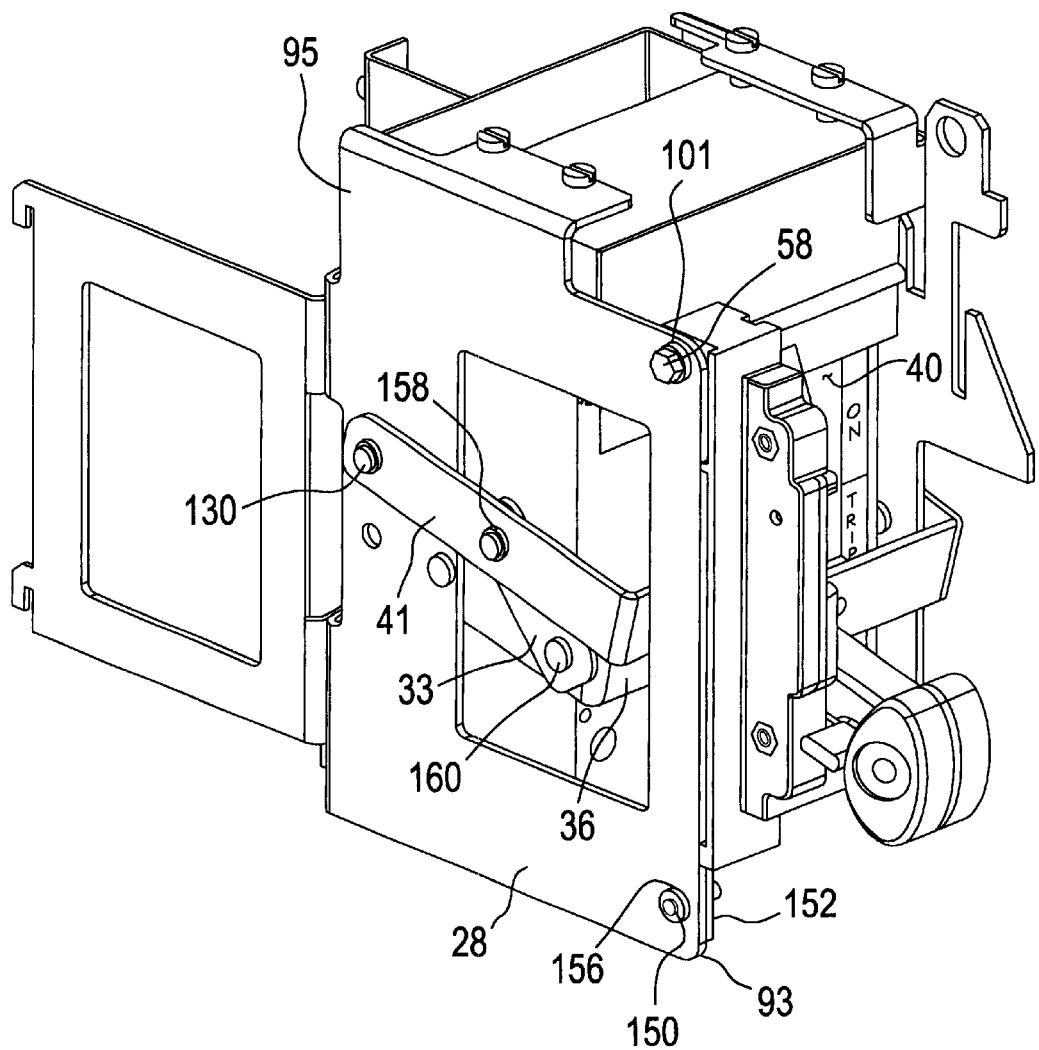
FIG. 3 is a side perspective view of the handle operating assembly of FIG. 2.

Referring to FIGS. 2 and 3, the mounting of the circuit breaker assembly 18 within the enclosure 11 will be described. In FIG. 2, a handle support assembly 26 is shown.

The circuit breaker assembly 18 attaches to rear wall 25 through an accessory enclosure support 34. The circuit breaker 22 is mounted on the handle support assembly 26 (FIG. 2). The handle support assembly 26 is defined by a pair of opposing sidearms 28, 30 with a bottom connecting bight 32. The circuit breaker 22 is mounted to bottom connecting bight 32 which is mounted to the accessory enclosure support 34 using mechanical fasteners (not shown). The circuit breaker 22 is positioned on the bottom bight 32 intermediate the sidearms 28, 30 of the handle support assembly 26. Sidearm 28 includes an end 93 and an opposing end 95. End 95 is proximate to the accessory enclosure support 34. End 93 of sidearm 28 includes an aperture 156 and an aperture 101. Apertures 156, 101 are located in opposing corners of end 93 and accept mechanical fasteners 150, 58, respectively. Preferably, mechanical fasteners 150, 58 are screws.

A U-shaped actuator 36 extends across the top of the handle support assembly 26 to provide a circuit breaker handle access slot 37. A circuit breaker operating handle 38 extends through access slot 37. The U-shaped actuator 36 comprises a top bight 51, an angled sidearm 48 and an angled sidearm 50 (shown in phantom). Angled sidearms 48, 50 are positioned on opposite sides of the circuit breaker 22 and extend alongside the circuit breaker operating handle (switch) 38 for picking up the logic of the position of the circuit breaker operating handle 38 as it moves between ON, TRIP, OFF and RESET positions.

Figure 6:
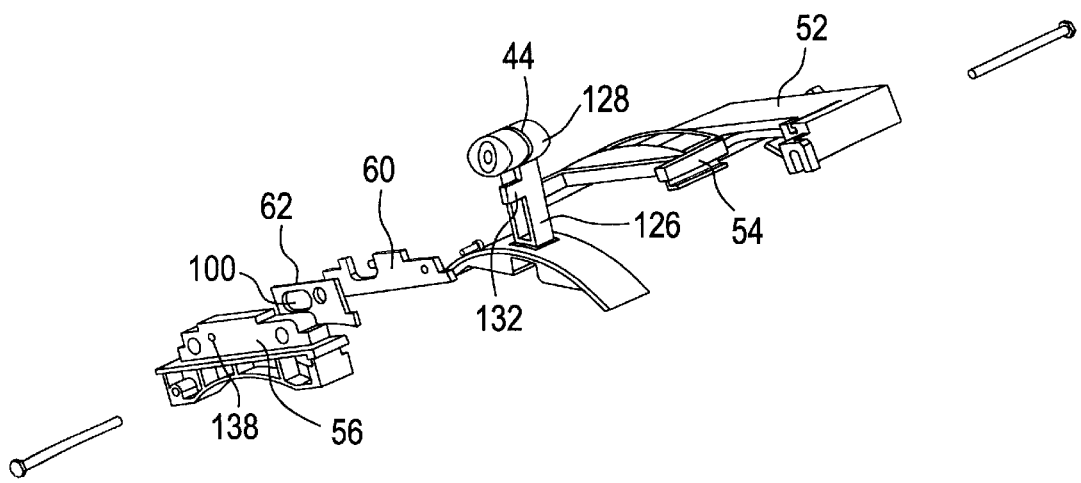
FIG. 6 is an assembly view of the components of the handle operator assembly of FIG. 3 viewed in an opposing direction to that of FIG. 5.

The handle operating assembly 20 in mounted on a face plate 42. Face plate 42 includes an elongated slot 40 for transfer of a handle operator 44. Handle operator 44 includes a stem portion 126 and a handle 128 mounted on the stem portion 126 for use by the end user. Handle operator 44 includes a base 53 having a bottom side 133 and an opposing top side 135. A stem portion 126 extends from the top side 135 and includes a handle 128 extending therefrom for use by the end user. The stem portion 126 of the handle operator 44 includes an outwardly extending tab 132 (FIG. 6). An arm 154 is integrally formed with the face plate 42 and will be further detailed in reference to FIG. 6.

Figure 4:
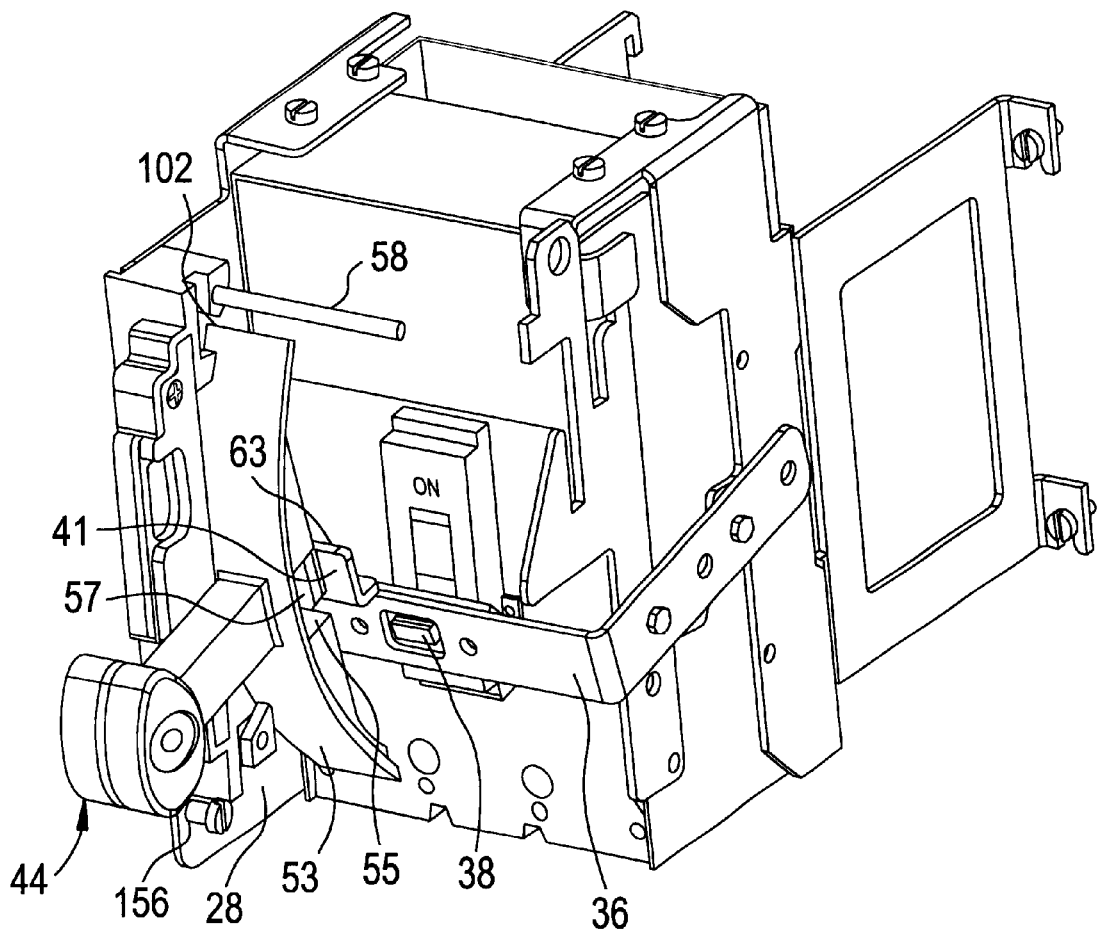
FIG. 4 is a perspective view of a circuit breaker within the motor control center of FIG. 1 including a partial view of the handle operating assembly.
Figure 5:
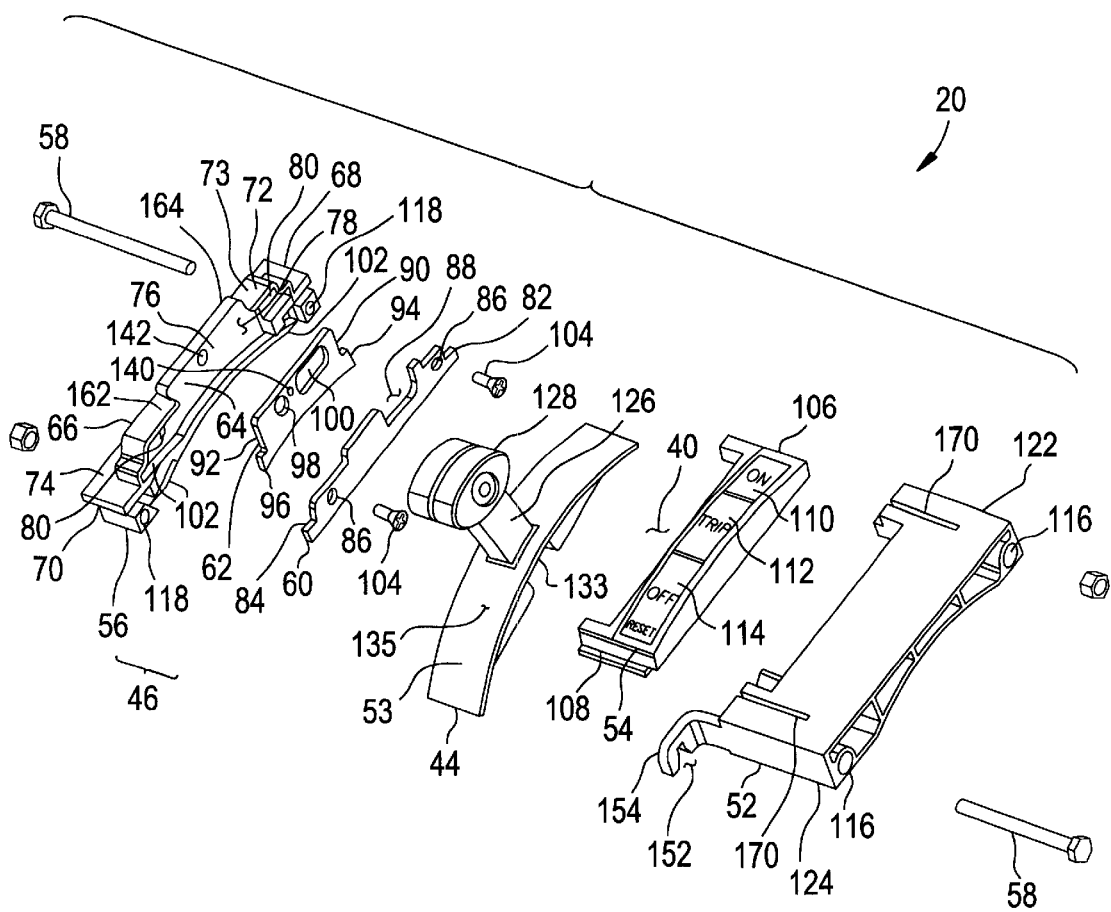
FIG. 5 is an assembly view of the components of the handle operator assembly of FIG. 3.

Referring to FIGS. 3, 4 and 5, the handle operating assembly will be described in further detail. FIG. 5 shows the handle operator 44 and a handle link (link) 41.

A middle link (link member) 33 (FIG. 3) having an end 158 and an opposing end 160 is shown in FIG. 4. End 158 is connected to the link 41 and end 160 is connected to the actuator 36 thus effecting the connection between the actuator 36 and the link 41. The link 41 includes an end 130 and an opposing end 63. End 130 is mounted to the sidearm 28, preferably with the use of mechanical fasteners. End 63 of the link 41 contains a L-shaped section 57. An opening 55 located in the base 53 of the handle operator 44 releasably engages end 63 and preferably, the L-shaped section 57. In this way, the link 41 is actuated by the handle operator 44.

As described hereinabove, the handle operator 44 is movable within elongated slot 40 between the RESET position, at one end of slot 40, to the ON position, at an opposite end of slot 40. Moving the handle operator 44 to the OFF position separate a pair of main contacts (not shown) within the circuit breaker 22 to stop the flow of electrical current through the main contacts. Moving the handle operator 44 to the ON position brings the main contacts into contact to allow the electrical current to flow through the main contacts to a protected load. When the circuit breaker 22 is tripped, the handle operator 44 will move to an intermediate position to indicate the TRIP position. To reset the circuit breaker 22, the handle operator 44 is first moved to the RESET position.

Referring to FIGS. 5 and 6, the components of the handle operator assembly 20 including a locking device 46, are shown prior to assembly relative to the circuit breaker 22 (FIG. 1). FIG. 5 shows the handle operator assembly 20 when viewed from sidearm 30 while FIG. 6 shows the handle operator assembly 20 when viewed from the sidearm 28.

Locking device 46 is secured within the handle operator assembly 20. Locking device 46 locks the handle operator 44 in the OFF position. The OFF position is shown in FIG. 3. There is also a feature to be detailed hereinafter that permits the capability to lock the handle operator 44 in the ON position.

The handle operator assembly 20 includes a segment 52, an indicator segment 54, a segment 56, a handle operator 44 and a support plate 60. Segments 52, 54, 56 and support plate 60 form the face plate 42 (FIG. 2). The segments 52, 54, 56, support plate 60 and handle operator 44 of the handle operator assembly 20 are preferably manufactured using a stereo lithography process. Tab 132 of stem portion 126 is preferably integrally formed with the stem portion 126 and extends outward from the stem portion 126.

Segment 52 includes an end 122 and an opposing end 124. Proximate ends 122, 124 are apertures 116, 117, respectively accessible from the exterior of the handle operating assembly 20 and suitable for accepting mechanical fasteners 58, 59, respectively. Arm 154 is shown in detail as integrally formed with segment 52 and includes a cutout 152 that aligns with aperture 156 of the sidearm 28 of the handle operating assembly 20.

Indicator segment includes an end 106 and an end 108. Indicator segment is portioned into a first, TRIP and OFF sections 110, 112, 114, respectively. The ON section 110 proximate end 106 and marked with "ON" to indicate the "ON" position as described hereinabove. The OFF section 116 proximate end 108 is marked "OFF" to indicate the "OFF" position as described hereinabove. The TRIP section 114 indicates the "TRIP" position of the circuit breaker as described hereinabove, "TRIP" is marked approximately midway between the marks for "ON" and "OFF".

When the circuit breaker 22 is in the OFF, TRIP or ON positions, the handle operator 44 will be adjacent the OFF section 114, TRIP section 112 or ON section 110, respectively thereby providing visual indication to the end user.

Segment 56 includes a base section 74 and a flange section 76 continuous with the base section 74 and a surface 64 facing towards the interior of the assembly and an opposing surface 66. Segment 56 also includes an end 68 and an opposing end 70. Proximate ends 68, 70 are apertures 118, 119 accessible from the exterior of the handle operating assembly 20 and suitable for accepting mechanical fasteners 58, 59, respectively. Aperture 118 proximate end 68 aligns with aperture 101 of sidearm 28.

Surface 64 of the flange section 76 and located at opposing ends 144, 146 are apertures 80. Near end 68 of the flange section 76 is a projection 72 extending preferably towards the center of the segment 56 and similarly, near end 70 of the flange section 76 is a projection 162 that extends inward toward the center of the segment 56. Extending towards the interior of the handle operator assembly 20 and positioned between the projections 72, 162 is a projection 164. The base section 74 includes slots 102 projecting inward toward the interior of the handle operator assembly 20. The surface 64 of the flange section 76, preferably at the top center as shown in FIG. 5 includes a recess 142. It is noted that the flange section 76 which includes the projections 72, 162, 164 and the base section 74 share continuous surfaces 64, 66. Also, projections 72, 162, 164 are contiguous and form part of the outer surface 66 of the segment 56. Segment 56 also has a pocket section 78 formed in the interior of the center portion of the base and flange sections 74, 76 and outlined, in part, by projections 72, 162, 164. There is also provided on the surface 66 of segment 56 a dimple 138.

Finally, support plate 60 includes an end 82 and an end 84. Extending crosswise and proximate to ends 82, 84 are apertures 86. Support plate 60 also includes a cutout 88 proximate to the end 82 where the cutout 88 projects outward towards the exterior of the handle operator assembly 20. Apertures 86 of the support plate 60 are positioned to align with apertures 80 of segment 56.

The locking device 46 includes a slide plate 62. The slide plate 62 is preferably made of sheet metal.

Slide plate 62 includes an end 90 and an end 92. A tab 94 extends outward from end 90 in the lengthwise direction. Similarly, a tab 96 extends outward from end 92. Slide plate 62 also includes an aperture 98, preferably circular in shape, and sized to accept a padlock and also an aperture 100, preferably oblong in shape, and sized to accept more than one padlock, preferably two. Dimple 138 of segment 56 aligns with aperture 100, cutout 88 and with the TRIP section 112 of the indicator segment 54. Positioned within the slide plate 62, preferably near the top center and most preferably between apertures 98, 100 is a dimple 140. Dimple 140 is aligned with recess 142 of the segment 56.

The assembly of the locking device 46 within the handle operator assembly will now be described.

The base 53 of the handle operator 44 is slidingly engaged within slots 102 of the base section 74 of segment 56 (FIGS. 4, 5). The slide plate 62 is placed within the pocket section 78 of segment 56 such that it rests on the base 53 of the handle operator 44. Next, the apertures 86 at ends 82, 84 of the support plate 60 are aligned with apertures 80 at ends 68, 70 of the segment 56, respectively such that mechanical fasteners 104 are inserted therethrough securely attaching the support plate 60 to the segment 56 with the slide plate 62 located within the pocket section 78. Once secured in this way, cutout 88 of support plate 60 is aligned with aperture 100 of slide plate 62. Further, once the support plate is attached to the segment 56, the slide plate 62 is permitted vertical movement within pocket section 78. It is also noted that dimple 140 of the slide plate 62 rests inside recess 142 of segment 56 in a snap-fit manner to releasably engage the slide plate 62 inside the pocket section 78 during normal operation of the handle operator 44.

Indicator segment 54 mates between segments 52, 56 forming slot 40. The handle operator 44 is then positioned within slot 40 and between the support plate 60 and the indicator segment 54. End 106 of the indicator segment 54 is aligned on the same side of the handle operator assembly 20 as is end 82 of support plate 60 as well as end 68 of segment 56. Handle operator 44 is free to move within slot 40 from the ON position to the RESET position. It is noted that once assembled in this manner, cutout 88 of support plate 60 is aligned with the trip section 112 of the indicator segment 54.

Next, indicator segment 54 slidingly mates with slots 170 of the segment 52. Apertures 116 of segment 52 are aligned with apertures 118 of segment 56. Aperture 101 of sidearm 28 of the handle support assembly 26 aligns with the aperture 118 located proximate end 68 of segment 56. Any process commonly used in circuit breaker manufacturing can be used to affect the assembly of segments 52, 56, to each other and finally to sidearm 28 of the handle support assembly 26, such as the use of mechanical fasteners 58, 59. Mechanical fastener 58 is inserted through apertures 101, 118 and 116 to thereby attach segments 52 and 56 together and attach the handle operating assembly 20 to sidearm 28. Mechanical fastener 59 is inserted through apertures 117, 119 to thereby attach segments 52 and 56 together. It is noted that once segments 52, 56 are fastened together, the indicator segment 54, handle operator 44 are held in their respective positions as described hereinabove.

Figure 9:
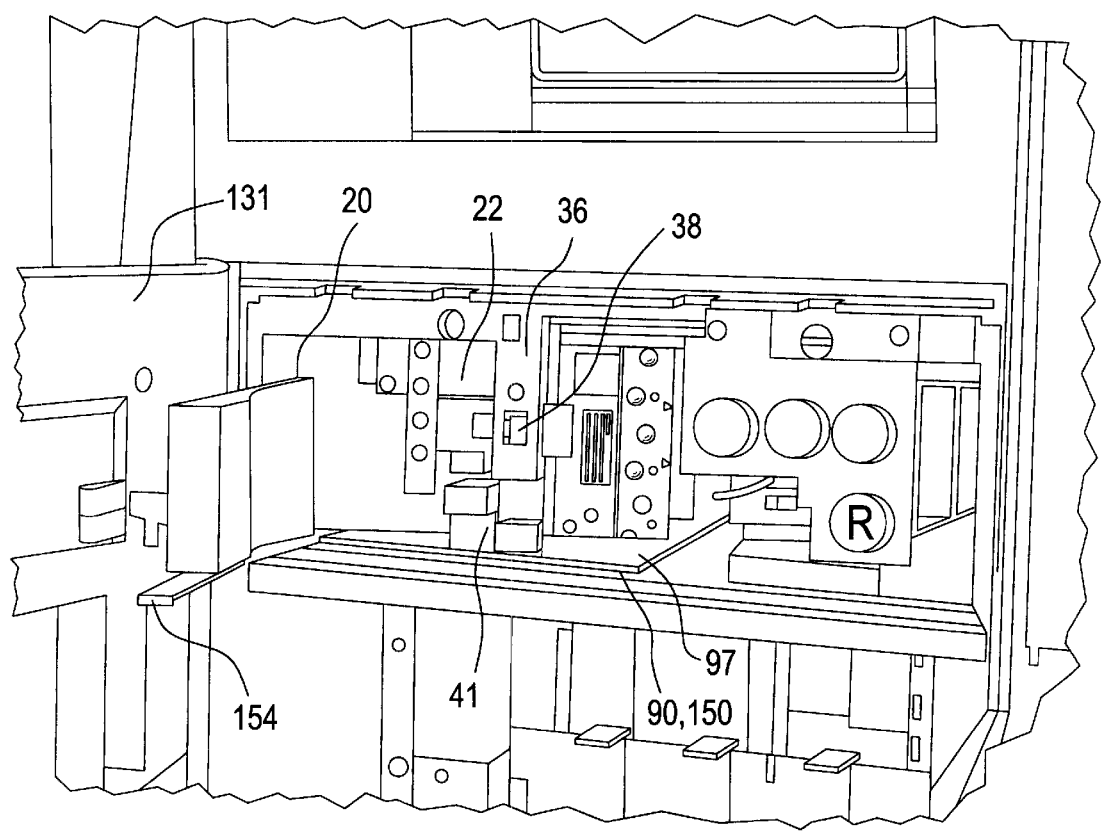
FIG. 9 is a front perspective view showing the handle operating assembly rotated open to provide access to the circuit breaker.

Finally, the handle operating assembly is further fastened to the sidearm 28 by a mechanical fastener 150 that is inserted through aperture 156 in the sidearm 28 and the cutout 152 on arm 154. Preferably, mechanical fastener 150 is a screw and includes a threaded insert 97 (FIG. 9). The mechanical fastener 150 thus further secures the handle operating assembly 20 to the arm 28. If the mechanical fastener 150 is loosened by approximately about one-half to two threads such that the arm 154 is loosened and can slide free of the cutout 152. The handle operating assembly 20 is then free to rotate about mechanical fastener 58 to expose the circuit breaker 22.

Referring to FIGS. 4 and 9, the manner in which the handle operating assembly 20 is rotated about a pivot 154 to access the circuit breaker 22 will now be described. FIG. 9 shows the handle operating assembly 20 rotated open about pivot 154 to provide access to the circuit breaker 22.

First, as is shown in FIG. 9, a door 131 located on the motor control center 10 through which the handle operating assembly 20 is exposed to the end user or operator is opened. Next, the mechanical fastener 150 is loosened by approximately about one-half to two threads such that the arm 154 is loosened and can slide free of the cut out 152. The handle operating assembly 20 is then free to rotate about mechanical fastener 58 to expose the circuit breaker 22. The mechanical fastener 150 is only loosed and remains in aperture 156.

Referring to FIGS. 4 and 9, it is also noted that the handle operating assembly 20 can be rotated open when the handle operator 44 is in the OFF, ON or TRIP positions. Further, after rotating open the handle operating assembly 20 as previously described herein, the handle operating assembly 20 is closed or rotated back into the same position (i.e. OFF, ON or TRIP) from which it was opened. If an end user attempts to close the handle operating assembly 20 in a position (i.e. OFF, ON or TRIP) other than that from which it was opened, the link 41, and in particular the L-shaped section 57 will no longer be aligned with opening 55 in the base 53 thereby causing interference that will not permit the handle operator 44 to properly engage.

Figure 7:
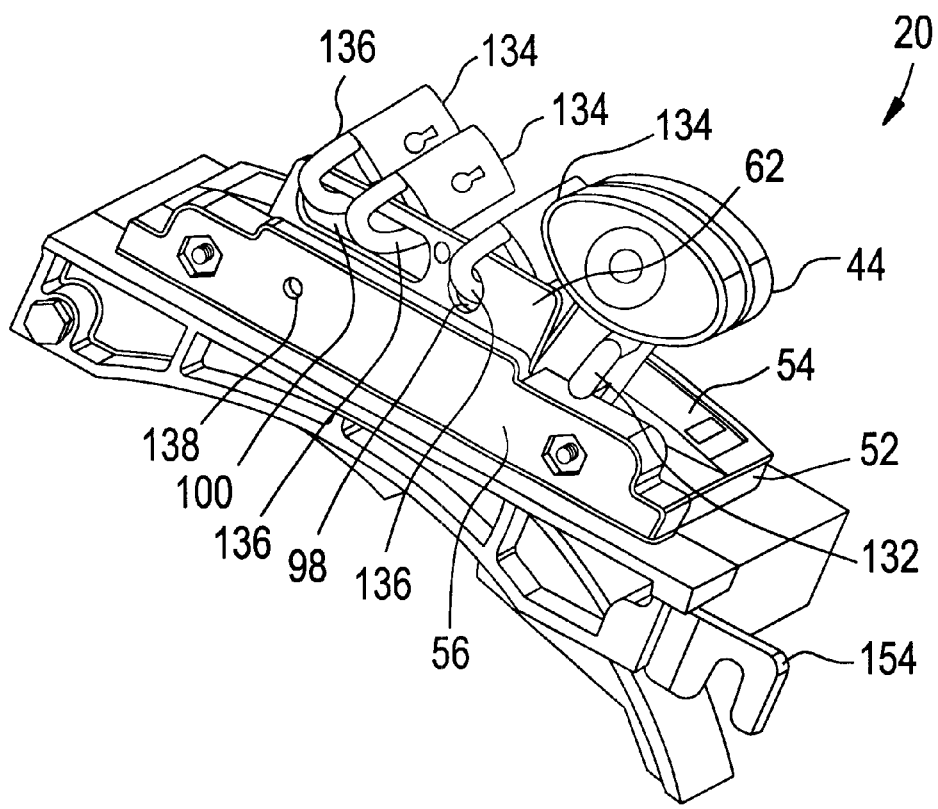
FIG. 7 is a partial perspective view showing the handle operator locked in the OFF position.

Referring to FIGS. 5, 6 and 7, the manner in which the handle operator 44 is locked in the desired OFF or ON position will now be described. FIG. 7 shows the handle operator 44 locked in the OFF position.

To lock the handle operator 44 once it is in the OFF position, the end user pulls the slide plate 62 out from the pocket section 78 through the cutout 88 and attaches a padlock 134 through apertures 98, 100 as shown in FIG. 7. Apertures 98, 100 provide the capability to attach multiple padlocks 134 any one of which will prevent handle operator 44 operation.

The padlock 134 includes a hasp 136 that once inserted through apertures 98, 100 keeps the slide plate 62 extended from the pocket section 78. Tab 132 prevents the handle operator 44 from moving in slot 40 to the ON position since in order for slide plate 62 to be pulled out, tab 132 must be cleared. Tab 132 is only cleared when the handle operator 44 is in the true OFF position. Thus, the handle operator can only be locked in the true OFF position. As shown in FIG. 7, the length of the slide plate 62 when pulled out extends partly into the ON section 110, through the TRIP section 112 and partly into the OFF section 114. It is noted that the handle operator 44 can not be locked in the ON position when the slide plate 62 is pulled out since tab 132 can not be cleared by the slide plate 62. Therefore, the only position in which the end user can lock the handle operator 44 when the slide plate 62 is pulled out is the OFF position.

The handle operator 44 may be moved within slot 40 to the ON position from the OFF position when the padlock 134 is removed and the slide plate 62 is pushed down. Tab 132 will not permit the handle operator 44 to move from the OFF position to the ON position if the slide plate 62 is extended or pulled out from pocket section 78.

Figure 8:
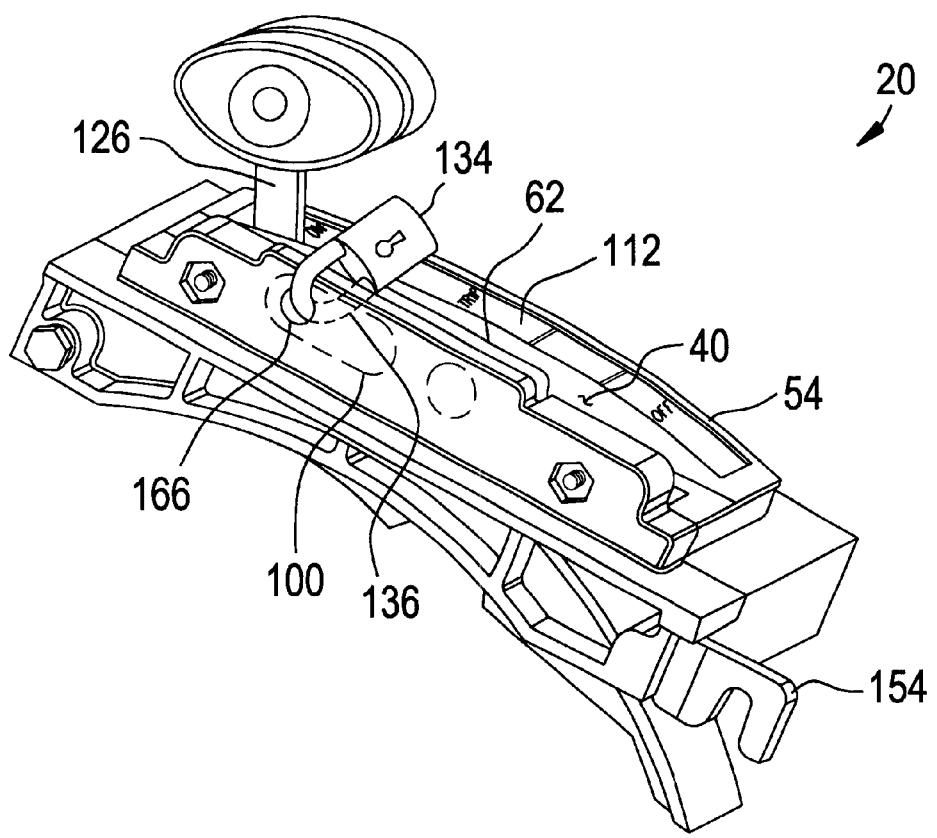
FIG. 8 is a partial perspective view showing the handle operator locked in the ON position.

Referring to FIG. 8, the handle operator assembly 20 is shown locked in the ON position. To lock the handle operator 44 when in the ON position, the end user pushes down the slide plate 62 and drills an aperture 166 through the dimple 138 (FIG. 7). Padlock 134 may then be inserted through aperture 166 and through aperture 100 (shown in phantom). In this way, the hasp 136 of the padlock 134 is in slot 40 adjacent the TRIP section 112 of the indicator segment 54. The handle operator 44 is in slot 40 adjacent the ON section 110 of the indicator segment 54 with the hasp 136 preventing the stem portion 126 from movement in slot 40 out of the ON position.

As described herein, the locking device 46 provides ease of operation and reliable locking. The locking device 46 is used for locking the handle operator 44 of the electrical disconnect switch in OFF position. Yet, the locking device 46 is versatile and may also be used, at the option of the end user, to lock the handle operator in the ON position. The locking device is easily employable by authorized end users who may readily lock and unlock the locking device in the OFF or ON positions. Further, the locking device permits the use of multiple padlocks 134. This feature allows more than one end user, performing maintenance or service for example, to lock the switch in the OFF position while work is being performed on the motor control center 10. The locking device 46 also ensures that when the handle operator 44 is desired to be locked in the OFF position, it is in the true or positive OFF position before the padlock 134 is employed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A locking device for use on an electric disconnect switch having a handle operator assembly including a handle operator movable between a first position and a second position, the locking device comprising:
    a slide plate slidably positioned within the handle operator assembly, said slide plate slidable in a first direction to block movement of the handle operator between the first and second positions and secure the handle operator in an engaged position, said slide plate slidable in a second direction to allow movement of the handle operator between the first and second positions; and
    a first lock arranged to prevent translation of said slide plate in said second direction and thus securing the handle operator in said engaged position.

2. The locking device of claim 1 further including:
    a support plate fixedly attached within the handle operator assembly, said slide plate slidably engaged with said support plate in said first and second directions.

3. The handle operator assembly of claim 2 wherein said first lock is a padlock.

4. A handle operator assembly for use on an electric disconnect switch, the handle operator assembly comprising:
    a handle operator extending outward from the electric disconnect switch and movable between a first position and a second position; and
    a locking device including:
        a slide plate slidably positioned within the handle operator assembly, said slide plate slidable in a first direction to block movement of the handle operator between the first and second positions and secure the handle operator in an engaged position, said slide plate slidable in a second direction to allow movement of the handle operator between the first and second positions; and
        a first lock arranged to prevent translation of said slide plate in said second direction and thus securing said handle operator in said engaged position.

5. The handle operator assembly of claim 4 further including:
    a support plate fixedly attached within said handle operator assembly, said slide plate slidably engaged with said support plate in said first and second directions.

6. The handle operator assembly of claim 5 wherein said slide plate includes a first aperture and said slide plate is positionable in a first and a second engagable positions, said slide plate extends from the handle operator assembly in said first engagable position and said first lock is mounted within said first aperture and prevents said handle operator from moving from the second position to the first position.

7. The handle operator assembly of claim 6 wherein said handle operator includes a tab extending therefrom, said tab prevents said handle operator from moving from the second position to the first position when said slide plate is in said first engageable position.

8. The handle operator assembly of claim 7 wherein said handle operator includes a stem portion and a handle, said handle mounted on an end of said stem portion and wherein said tab is integral with said stem portion.

9. The handle operator assembly of claim 6 further including a second lock and wherein said slide plate includes a second aperture, said second lock mounted within said second aperture.

10. The handle operator assembly of claim 6 further including a first segment matable with a second segment and having a slot therebetween, said handle operator assembled between said first segment and said second segment for slidable movement in said slot between the first position and the second position.

11. The handle operator assembly of claim 10 wherein said support plate attaches to an inner surface of said second segment forming a pocket section therebetween and said slide plate is captively held in said pocket section.

12. The handle operator assembly of claim 11 wherein said second segment includes a first end and an opposing second end, said first end having a projection and said second end having a projection, said projections extend into said pocket section, said slide plate having a tab extending from a first end thereof and a tab extending from an opposing end thereof and said tabs of said slide plate engage said projections to prevent said slide plate from being disengaged from the handle operator assembly when said slide plate is in said first engageable position.

13. The handle operator assembly of claim 11 wherein said second segment includes a recess and said slide plate includes a dimple, said dimple snappingly engages said recess when said slide plate is in said second engageable position.

14. The handle operator assembly of claim 11 wherein said slide plate retracts in said second direction to said pocket section.

15. The handle operator assembly of claim 10 wherein said support plate includes a cutout, said cutout aligns with said second aperture of said slide plate when said slide plate is in said second engageable position, said second segment includes a dimple.

16. The handle operator assembly of claim 15 wherein said second segment includes an aperture and said first lock is mounted within said aperture and extends through said cutout and abuts said handle operator and prevents said handle operator from moving from the first position to the second position.

17. The handle operator assembly of claim 15 wherein said cutout is configured to allow grasping said slide plate from within said pocket section for translation of said slide plate in said first direction.

18. A motor control center comprising:
a motor control center enclosure having a top, bottom, rear wall and sidewalls;
a circuit breaker assembly within said motor control center enclosure, said circuit breaker assembly including a handle operator assembly mounted to said circuit breaker assembly, said handle operator assembly including:
a handle operator extending outward from the electric disconnect switch and movable between a first position and a second position; and
a locking device including:
a slide plate slidably positioned within the handle operator assembly, said slide plate slidable in a first direction to block movement of the handle operator between the first and second positions and secure the handle operator in an engaged position, said slide plate slidable in a second direction to allow movement of the handle operator between the first and second positions; and
a first lock arranged to prevent translation of said slide plate in said second direction and thus securing said handle operator in said engaged position.

19. The motor control center of claim 18 further including:
a support plate fixedly attached within said handle operator assembly, said slide plate slidably engaged with said support plate in said first and second directions.

20. The motor control center of claim 19 wherein said slide plate includes a first aperture and said slide plate is positionable in a first and a second engageable positions, said slide plate extends from the handle operator assembly in said first engageable position and said first lock is mounted within said first aperture and prevents said handle operator from moving from the second position to the first position.

21. The motor control center of claim 20 wherein said handle operator includes a tab extending therefrom, said tab prevents said handle operator from moving from the second position to the first position when said slide plate is in said first engageable position.

22. The motor control center of claim 21 wherein said handle operator includes a stem portion and a handle, said handle mounted on an end of said stem portion and wherein said tab is integral with said stem portion.

23. The motor control center of claim 20 further including a second lock and wherein said slide plate includes a second aperture, said second lock mounted within said second aperture.

24. The motor control center of claim 20 further including a first segment matable with a second segment, and having a slot therebetween, said handle operator assembled between said first segment and said second segment for slidable movement in said slot between the second position and the first position.

25. The motor control center of claim 24 wherein said support plate attaches to an inner surface of said second segment forming a pocket section therebetween and said slide plate is captively held in said pocket section.

26. The motor control center of claim 25 wherein said second segment includes a first end and an opposing second end, said first end having a projection and said second end having a projection, said projections extend into said pocket section, said slide plate having a tab extending from a first end thereof and a tab extending from an opposing end thereof and said tabs of said slide plate engage said projections to prevent said slide plate from being disengaged from the handle operator assembly when said slide plate is in said first engageable position.

27. The motor control center of claim 25 wherein said second segment includes a recess and said slide plate includes a dimple, said dimple snappingly engages said recess when said slide plate is in said second engageable position.

28. The motor control center of claim 24 wherein said support plate includes a cut out, said cutout aligns with said second aperture of said slide plate when said slide plate is in said second engageable position, said second segment includes a dimple.

29. The motor control center of claim 28 wherein said second segment includes an aperture and said first lock is mounted within said aperture and extends through said cut out and abuts said handle operator and prevents said handle operator from moving from the first position to the second position.

30. The motor control center of claim 18 wherein said first lock is a padlock.

31. A locking device for use on an electric disconnect switch having a handle operator assembly including a handle operator movable between a first position and a second position, the locking device comprising:
a slide plate slidably positioned within the handle operator assembly, said slide plate slidable in a first direction to block movement of the handle operator between the first and second positions and secure the handle operator in an engaged position, said slide plate slidable in a second direction to allow movement of the handle operator between the first and second positions; and
a locking means to prevent translation of said slide plate in said second direction, thus securing the handle operator in an engaged position.

32. The locking device of claim 31 further including:
a support plate fixedly attached within the handle operator assembly, said slide plate slidably engaged with said support plate in said first and second directions.

* * * * *